United States Patent [19]
Benson et al.

[11] Patent Number: 5,045,147
[45] Date of Patent: Sep. 3, 1991

[54] FILAMENT WINDING SYSTEM

[75] Inventors: Vernon M. Benson, South Jordan, Utah; Dee R. Gill, Seattle, Wash.; Boyd L. Hatch, Salt Lake City; John A. Johnson, Magna, both of Utah; Brian Moloney, Billings, Mont.; Noel I. Shepherd, Grantsville, Utah; Keith G. Shupe, Bountiful, Utah; William J. Weis, Magna, Utah

[73] Assignee: Hercules Incorporated, Wilmington, Del.

[21] Appl. No.: 275,313

[22] Filed: Nov. 23, 1988

[51] Int. Cl.⁵ ............... B65H 81/00; B32B 31/08; B32B 31/18; B32B 31/26

[52] U.S. Cl. ............... 156/429; 156/425; 156/430; 156/433; 156/544; 156/523; 156/574; 156/498; 156/353; 156/361; 156/577

[58] Field of Search ......... 156/574, 523, 525, 80, 156/498, 353, 361, 522, 577, 433, 425, 544, 428–432

[56] References Cited

U.S. PATENT DOCUMENTS

| | | |
|---|---|---|
| 3,574,040 | 4/1971 | Chitwood et al. ............... 156/522 |
| 3,775,219 | 11/1973 | Karlson et al. ............... 156/363 |
| 3,810,805 | 5/1974 | Goldsworthy et al. ............ 156/361 |
| 4,285,752 | 8/1981 | Higgins ............... 156/523 X |
| 4,292,108 | 9/1981 | Weiss et al. ............... 156/523 X |
| 4,364,892 | 12/1982 | Rehlen et al. ............... 156/498 X |
| 4,420,355 | 12/1983 | Saur ............... 156/522 X |
| 4,508,584 | 4/1985 | Charles ............... 156/353 |
| 4,557,790 | 12/1985 | Wisbey ............... 156/574 X |
| 4,591,402 | 5/1986 | Evans et al. ............... 156/353 X |
| 4,699,683 | 10/1987 | McCowin ............... 156/523 X |
| 4,790,898 | 12/1988 | Woods ............... 156/166 |
| 4,867,834 | 9/1989 | Alenskis et al. ............... 156/425 X |

Primary Examiner—Michael W. Ball
Assistant Examiner—Jeff H. Aftergut
Attorney, Agent, or Firm—David Edwards

[57] ABSTRACT

A filament winding system includes a head that selects the number of tows to be within a winding band while winding and positioning the winding band directly on the mandrel according to contours of the mandrel. Half of the tows are conveyed in an upper portion of the head and the remaining half are conveyed in a lower portion of the head with both halves meeting at an applicating roller at the discharge end of the tows. The head includes cut and add assemblies wherein the individual tows are selectively cut and later can be added to the band.

22 Claims, 7 Drawing Sheets

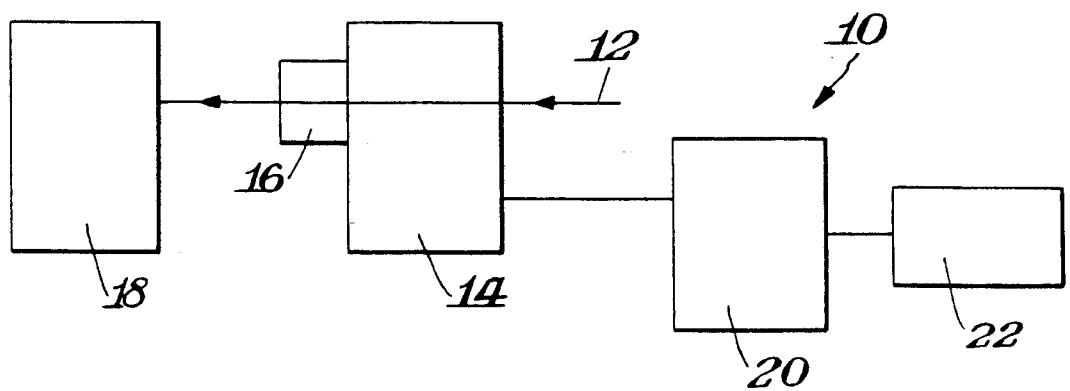
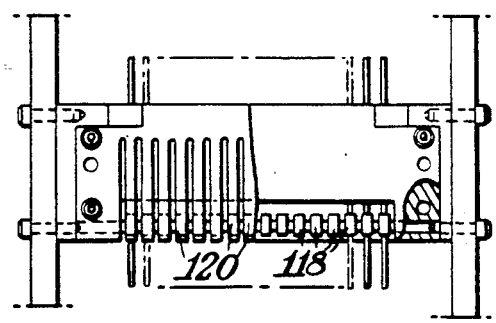
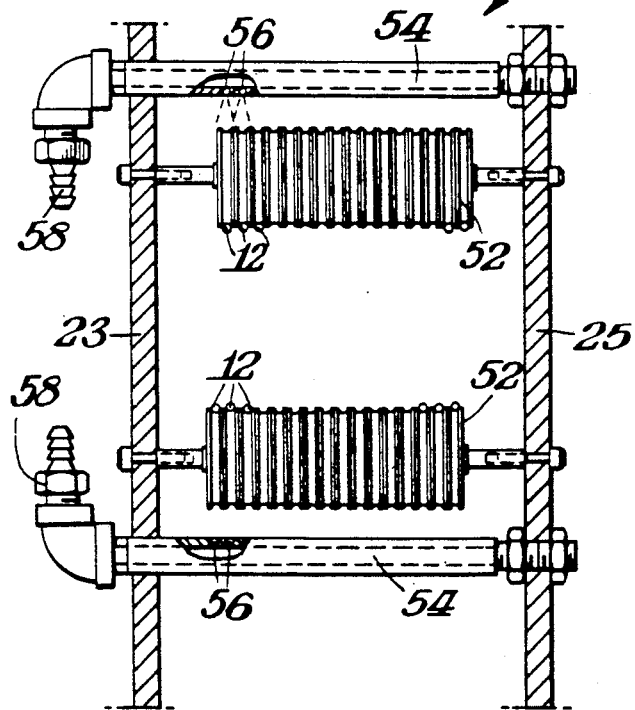

1

FILAMENT WINDING SYSTEM

BACKGROUND OF INVENTION

Present filament winding systems generally consist of winding fibrous rovings or tows impregnated with a thermosetting resin in a helical pattern in a number of superimposed layers onto a mandrel to produce a tubular article. In most types of filament winding operations, the rovings pass through a delivery eye or from a delivery roller across an air space onto the part. In that type of system, tows cannot be added or deleted during operation to adjust to the varying contours of the part being wound. Furthermore, that type of system is limited to geodesic or natural path fiber patterns. Conventional tape laying systems generally provide positioning of the rovings on flat or slightly contoured surfaces, however, these systems cannot wind two dimensional contours without fiber gaps or overlaps unless an impracticably narrow band is employed. Tape layers cannot vary the band width without terminating the entire band.

The inability to alter bandwidth while winding parts with non-uniform cross-section, such as fuselages, tapered wing skins, domes or missile nose cones, results in overlapping or gapping of the winding band. The inability to accurately place fiber at the optimum angle results in heavier than necessary designs. In some cases this results in a design which cannot be automated and or is less costly and no heavier if designed in metal.

U.S. Pat. No. 4,867,834 discloses a filament winding system which effectively overcomes disadvantages of prior systems. The system U.S. Pat. No. 4,867,834 however, involves an arrangement in which all of the tows are transported through the head in a single plane. Additionally, in that arrangement the tows are cut by a solenoid actuated knife which travels transversely across a slot. Addition of cut tows relied on the remaining tows providing the driving force. Therefore, only one half of the tows could be terminated.

It would be desirable if means could be provided to modify the type of assembly described in Ser. No. 163,141 so as to permit a greater number of tows to be handled, while maintaining a compact head and while minimizing the spread of the tows coming into the head. It is also desirable to terminate plies at specified locations like a conventional tape layer.

SUMMARY OF INVENTION

An object of this invention is to provide a filament winding head of the type described in U.S. Pat. No. 4,867,834.

A further object of this invention is to provide such a filament winding system wherein the tows are supplied through the head in two planes and wherein individual cutting elements are provided for each tow.

In accordance with this invention, a cut/add delivery head is provided for applying a plurality of tows to a mandrel to form an irregularly shaped object such as an airplane fuselage or the like wherein the delivery head includes an upper cut/add assembly and a lower cut/add assembly disposed at an angle thereto. The assemblies are substantially juxtaposed at their discharge ends and spaced apart from each other at their feed ends. The upper assembly is structurally the same as the lower assembly but is inverted therefrom.

In a preferred form of this invention, the means for cutting the tows includes a separate knife for each respective tow which is actuated at the proper time when that particular tow is not desired for the winding band. Similarly, each assembly includes a separate set of rollers for adding the cut tow back into the winding band when that tow is desired to be applied to the mandrel.

The delivery head preferably includes means for preheating the tows after they are fed in a distributed manner to the delivery head. This heating lowers the viscosity of the thermosetting resin and allows the pre-impregnated tow to be formed to the proper width and thickness as specified by the design. After the tows have been pre-heated, means are provided to freeze and stiffen the tows and thereby facilitate their subsequent cutting.

THE DRAWINGS

FIG. 1 is a schematic view showing the various components of the filament winding system in accordance with this invention;

FIGS. 14-16 are cross-sectional views taken through FIG. 2 along the lines 14—14, 15—15 and 16—16 respectively.

DETAILED DESCRIPTION

Figure 2:
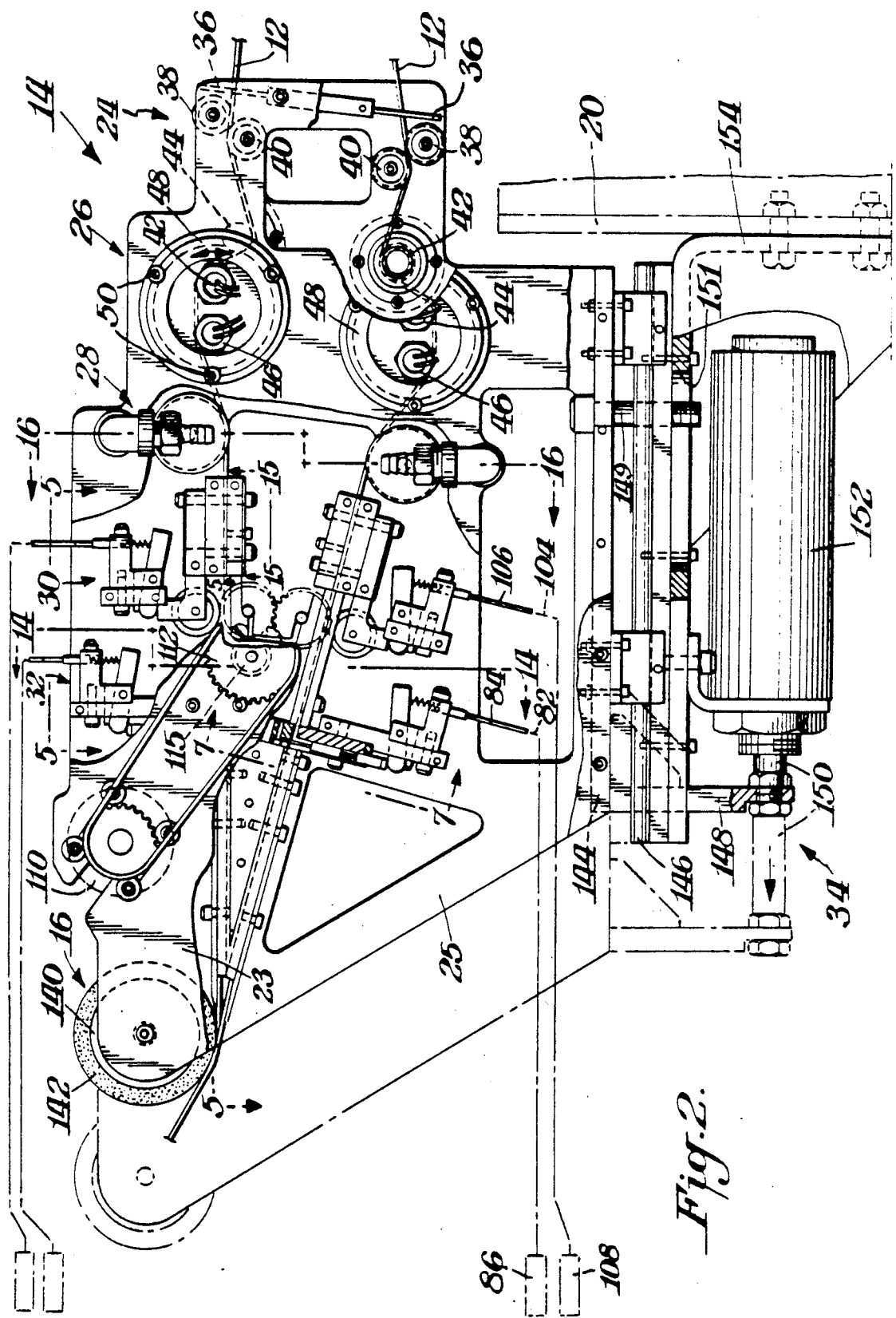
FIG. 2 is a side elevation view partly in section of the delivery head used in the system of FIG. 1.
Figure 3:
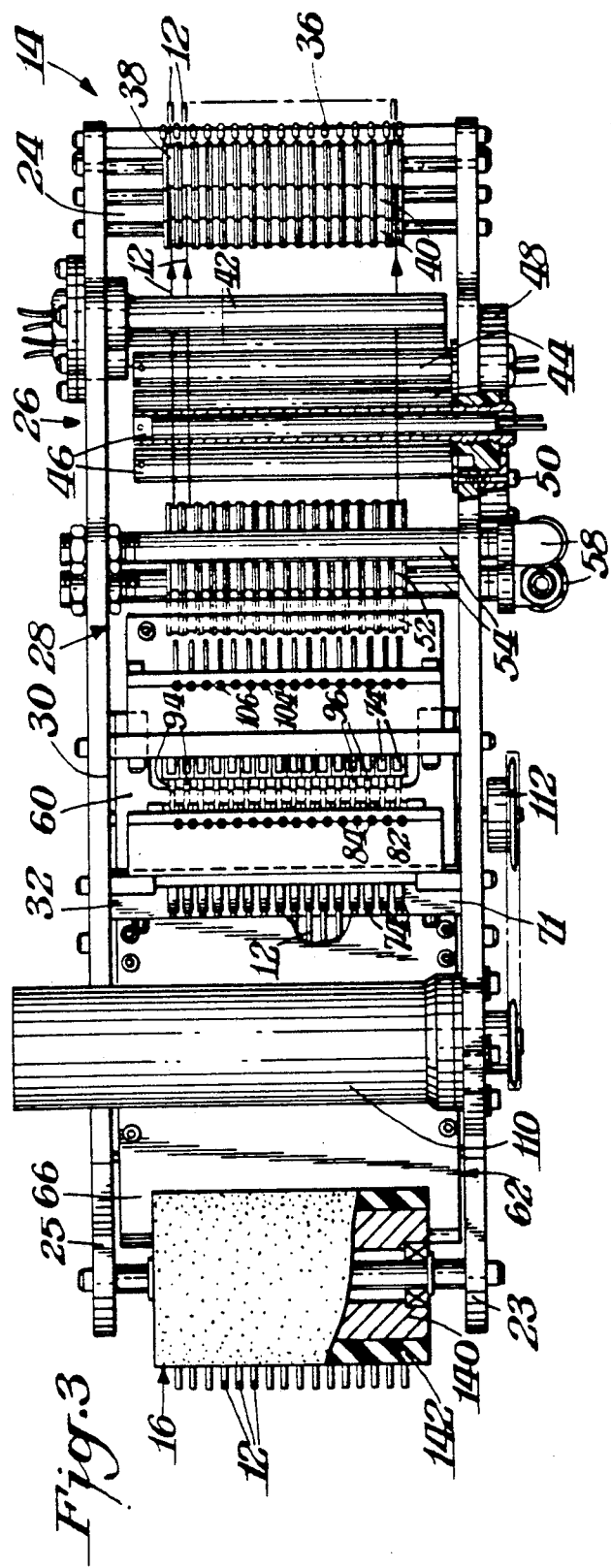
FIG. 3 is a top plan view of the filament head shown in FIG. 1.

FIG. 1 schematically illustrates a filament winding system 10 in accordance with this invention. As shown therein the winding band 12 passes through the delivery head 14 and is applied by a roller 16 to a mandrel 18 of irregular shape such as an airplane fuselage. (Roller 16 is illustrated spaced from mandrel 18 but in practice roller 16 would press against mandrel 18.) The delivery head 14 is mounted directly to a six axis machine 20 of the type disclosed in U.S. Pat. No. 4,867,834 the details of which are incorporated herein by reference thereto. As shown in FIG. 1 a computer 22 is also provided to control the various actions of the cut and add applications from filament head 14 and to control the multiple axis movement.

As shown in FIG. 2 the individual tows which compose the winding band 12 pass through different sections of filament winding head 14. These sections which are mounted to a chassis or frame 23, 25 of head 14 include a distributing section 24 where the individual tows are separated from each other for delivery into the winding head. The next section is a ribbonizing or heating section 26 where the tows are ribbonized or spread to a desired width and thickness before passing to a chilling section 28. Next the tows pass through an add section 30 and then to a cut section 32 and then to delivery roller 16 for being applied to the mandrel. The delivery head 14 is mounted on a reciprocating mechanism 34 so that it could be moved toward or away from the mandrel.

Figure 6:
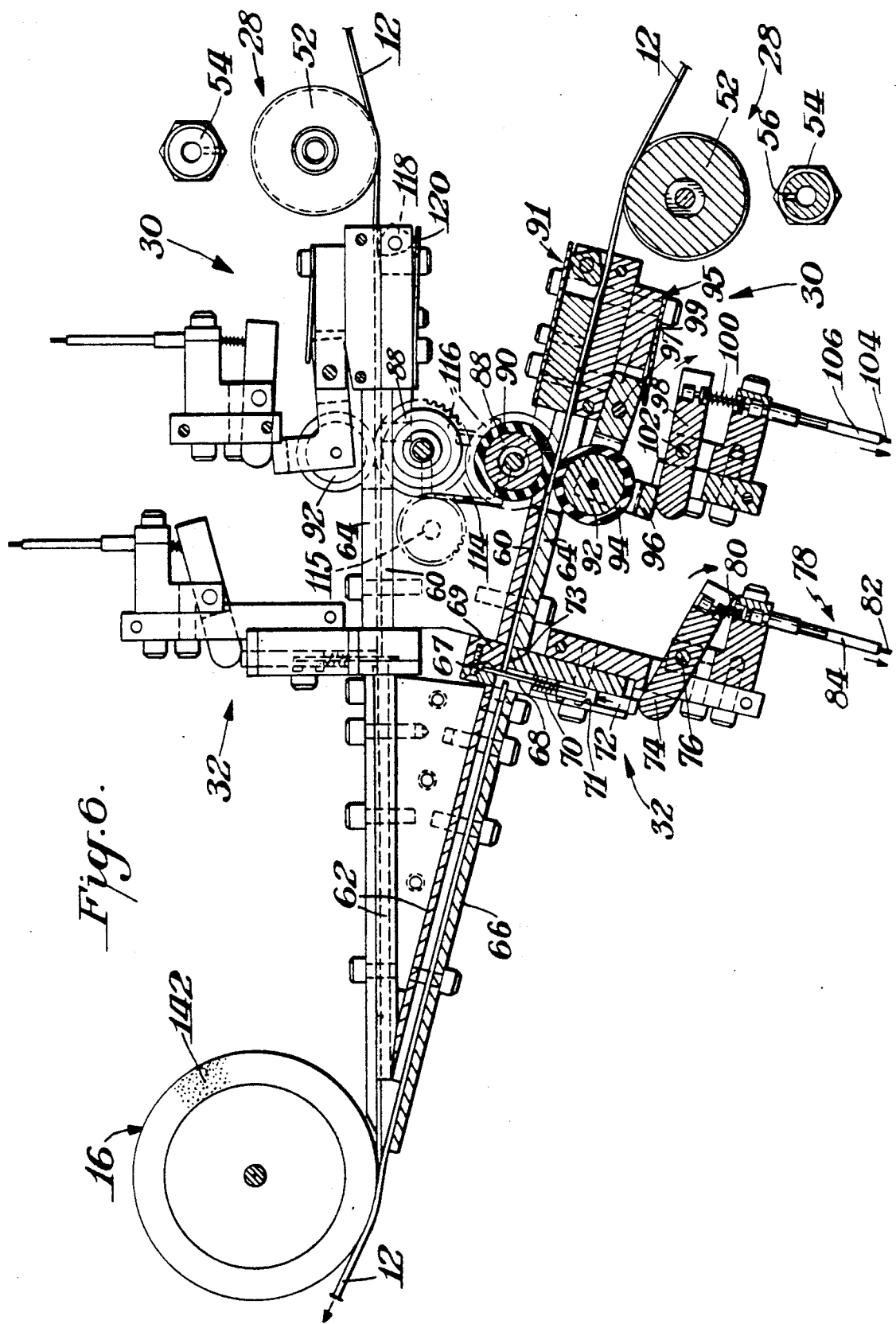
FIG. 6 is a cross-sectional view taken through FIG. 5 along the line 6—6.

As shown therein and more particularly as shown in FIG. 6, the various sections include upper and lower assemblies so that for example 32 tows can be applied in such a manner that 16 tows are applied in the upper assemblies while the remaining 16 are in the lower assemblies. The upper assemblies are thus identical to the lower assemblies but in inverted form. Accordingly, only one of each assembly will be described in detail.

Tow distributor section 24 may be of any suitable construction such as in U.S. Pat. No. 4,867,834. In the preferred practice of the invention the distributor section 24 is in the form of a plate having comb like structure at its upper and lower ends in the form of a series of holes to create spaced teeth 36 so that each tow may fit between adjacent teeth, thus 16 passageways for the 16 individual tows would be provided at the upper end of the comb and 16 similar passageways would be provided at the lower portion of the comb. The tows next pass between the nip of a pair of rollers 38, 40 which are grooved to maintain the tows in their properly spaced orientation. Thus, each roller 38, 40 would have 16 grooves, one for each tow. Alternatively an individual grooved roller could be provided for each tow, thus totalling 64 rollers.

The tows next enter the pre-heating section 26. As shown therein the tows pass over a generally S-curve formed by heating members 42, 44, 46. In the illustrated embodiment one of these members is appropriately grooved to maintain the proper spacing the tows 12. In the pre-heating section, member 42 is a single stationary electrically heated tube. Members 44, 46 comprise a double heater wherein each member 44, 46 contains a suitable heating device such as a cal rod resistance heater. The members 44, 46 are stationary rods or tubes mounted in such a manner that their orientation with respect to each other can be altered to change the S-angle and thereby control the ribbon width and thickness of the tows 12. In this respect, the heating members 44, 46 are mounted to a circular stationary roller 48 which can be rotated by loosening screws 50 to thereby adjust the relative position of rollers 44, 46.

The tows 12 next pass into the chilling section 28. Chilling section 28 is shown in greater detail in FIG. 16. Chilling section 28 functions to apply a cold gas or a cryogenic such as liquid nitrogen to the tows and to the cold roller 52 to chill and stiffen the tows so that they may be better handled in the downstream add and cut assemblies. As shown in FIG. 16 each set of tows passes over a set of rollers 52 mounted juxtaposed to a manifold 54. Manifold 54 contains a number of openings or nozzles 56 corresponding the number of rollers 52. Each nozzle 56 is positioned to direct the cold gas directly against the tow in a respective roller. Manifold 56 communicates with feed supply connection 58 which in turn communicates with the source of the cold gas.

The frozen tows next pass into the cut/add assemblies which comprises the cut assembly 32 and its upstream add assembly 30. The details of the cut/add assemblies are better shown in FIG. 6. These assemblies include a back plate 60 and a front plate 62 spaced from back plate 60 by a distance sufficient to permit the cutting knives to pass vertically in the spacing. The plates 60, 62 in the upper/assembly are generally horizontal and form an angle with inclined plates 60, 62 in the lower assemblies whereby, as shown in FIG. 6, the discharge or downstream ends of the plates 62, 62 are juxtaposed with each other while the feed ends or upstream ends of plates 60, 60 are spaced from each other. In this manner, the tows meet in a single plane immediately before being applied to applicating roller 16. The spacing of the individual tows is such that every other tow from the upper section is disposed between every other tow from the lower section to form the composite winding band.

Each plate 60, 62 is grooved with a number of grooves corresponding to the number of tows to provide passageways for the respective tows. A cover 64, 66 is associated with each plate to confine the tows in their respective passageways.

Generally, all 32 tows would form the winding band and are applied by roller 16 to the mandrel 18. Under certain conditions, however, because of the contour of the mandrel it is desirable to have less than the complete number of tows applied. This is achieved by the cut assembly 32. As shown therein, each cut assembly 32 includes an individual knife 68 associated with each path or passageway for a respective tow. Thus, for example, 16 individual knives would be provided for the upper assembly and 16 individual knives would be provided for the lower assembly.

Figure 7:
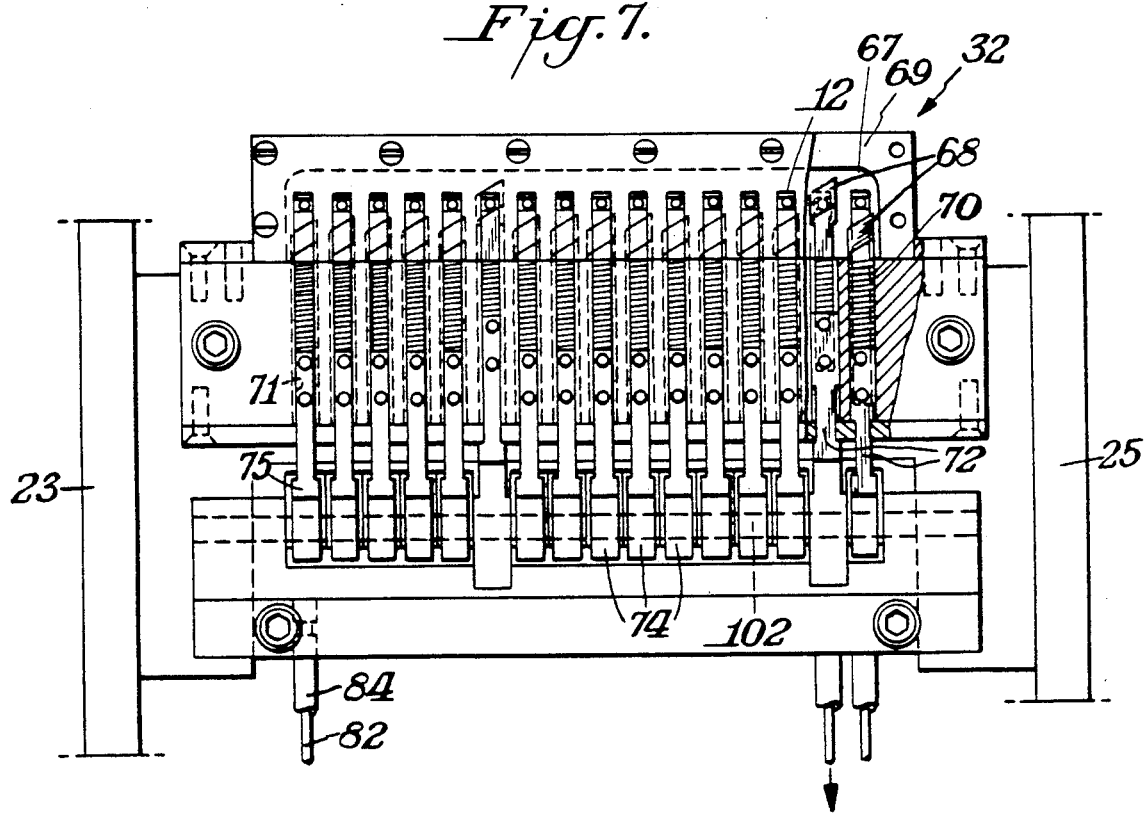
FIG. 7 is a cross-sectional view taken through FIG. 2 along the line 7—7.

FIGS. 6-7 show the general arrangement for the actuation of the actual knives. As indicated therein each knife 68 is mounted in a guide member 69 against a spring 70 which reacts between the knife and the actuating member 78 to urge member 78 downward in guide member 69. Actuating member 72 is disposed against a pivoted arm 74 pivotally mounted at pin 76. The remote end of arm 74 is connected to an actuating mechanism 78. Spring 80 ordinarily urges arm 74 in a counter clockwise direction which would result in the knives being in their in cutting condition when it is desired to actuate the knives as shown in the lower assembly of FIG. 6. The actuating mechanism 78 causes arm 74 to rotate in a clockwise direction whereby member 72 is urged upwardly overcoming the force of spring 70 to cause knife 68 to likewise move upwardly and cut a tow traveling through the open upper portion 67 of guide member 69 between the front and back plates. Knife 68 and member 72 travel in a U-shaped channel 71 in member 69. The enlarged base 75 of member 72 strikes the bottom of guide member 69 to act as a stop limiting the upward movement of knife 68. As previously discussed the upper assembly is a mirror image and would operate in the same manner.

Actuating mechanism 78 may take any suitable form. As shown herein the actuating member includes an inner cable 82 which is secured to the remote end of arm 74. Inner cable 82 in turn is co-axially mounted in outer cable 84 to shield and protect the inner cable. Inner cable 82 ultimately leads to a suitable actuating mechanism 86 which is controlled by computer 22 to cause the knives to be either in the cutting or in the inactive condition.

In accordance with the contour of mandrel 18 it may again be necessary to include a cut tow back into the winding band. This is accomplished by add assembly 30. As shown therein, each add assembly 30 includes a stationary roller 88 having any suitable covering material such as urethane layer 90. Associated with roller 88 is an add roller 92 likewise having a covering layer 94 of suitable material such as urethane. Roller 88 may be a single roller which extends the entire width of plate 60. Alternatively, an individual roller 88 may be provided for each tow. Rollers 92, however, are individual rollers with one such roller being provided for each tow. Rollers 92 are actuated in a manner similar to knives 68. In this respect, each roller 92 is mounted on an L-shaped member 96 which is pivot at 97 and rests against arm 98 spring biased in a counter clockwise position by spring 100 for rotation on pivot pin 102. An inner cable 104 is mounted to the remote end of arm 98 and is protected by outer cable 106. Inner cable is actuated or pulled downwardly by any suitable mechanism 108 (FIG. 2) which likewise is controlled by computer 22. Roller 92 would be moved in its actuated condition against roller 88 to squeeze a previously cut tow 12 and then drive the tow in a forward direction where it would again become part of the winding band. The cut tows are driven forward in any suitable manner. For example, as illustrated in FIG. 6 roller 88 is constantly driven by a sprocket arrangement motor 110 which drives sprocket and chain assembly 112 which drives gear 115 and gear 116. Bearing support 114 holds the drive roller shafts for roller 88 and gear 116.

The preferred method is to drive the add roller 88 at a surface speed matching that of roller 140. A feedback control system facilitates this so that the tows are added into the band at the same speed as the band is travelling.

As shown in FIG. 6 roller 92 is mounted on pivotally mounted L-shaped member 96. Spring finger 95 reacts against end 99 of member 96 to urge roller 92 away from roller 88 when cable 104 is no longer activated, thus releasing tow 12. Member 96 is mounted against block 91 which is mounted to frame 23, 25.

In accordance with this invention means are provided to prevent a cut tow from backing out of the feeding head. FIG. 6, for example, shows a cam 118 arranged for pressing against a cut tow to maintain that tow in the assembly until it is desired to have the tow re-enter the winding band. FIG. 15 illustrates a series of spring fingers 120 being provided reacting against cams 118 to act as check valves which press against the cut tows to likewise maintain them in the filament head until the tows are to re-enter the winding band.

It is to be understood that the invention is not limited to the specific details illustrated and previously described. For example, the cutting may be accomplished by a sharp cornered cylinder, such as a drill rod, which slides into a close tolerance hole in a plate over which the tow passes. This would be similar in action to a paper hole puncher. Other cutting variations could be based on laser, water jet or ultrasonic action.

A further variation is to pinch the tows by utilizing individual air cylinders to pinch the tow against a grooved tray. Such mechanism would be attached to the back of the head where the comb 36 is attached and the comb would be attached to the back of the pinching assembly.

Figures 8, 9, 10, 11, 12, 13:
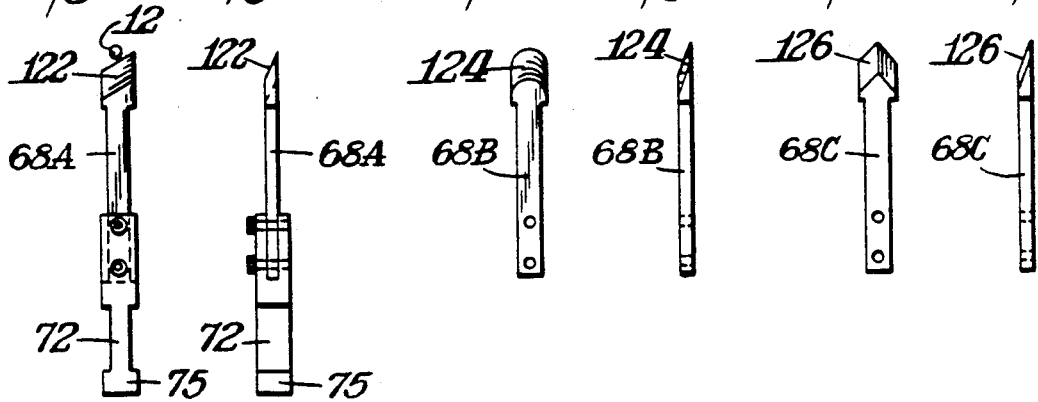
FIGS. 8-9 are front and side views of a chisel type cutter used with the filament head of FIGS. 2-7.
FIGS. 10-11 are front and side views of a spade type cutter used with the filament head of FIGS. 2-7.
FIGS. 12-13 are front and side views of a pointed cutter used with the filament head of FIGS. 2-7.
Figure 14:
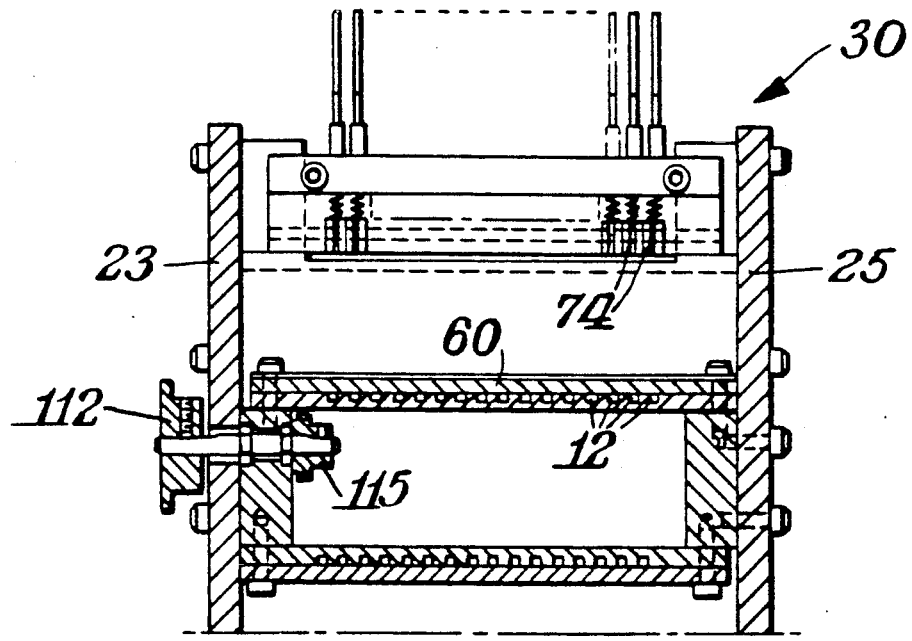

The knife 68 may take various constructions in accordance with the desired results. For example, FIGS. 8-9 illustrate a knife 68A to be of a chisel type with cutting end 122 for spreading to tow 12 as it is cut. FIGS. 10-11 illustrate a knife 68B to have a spade type cutting face 124. FIGS. 12-13 illustrate a knife 68C to have a pointed type cutting face 126.

As illustrated in FIG. 2 applicating means 16 is preferably in the form of a single roller 140 having a rubber outer layer 142 which conforms to the contour of mandrel 18 when pressed against the mandrel. Upper and lower plates 62, 62 are arranged to apply the winding band 12 tangentially to roller 140 across the width of the roller. If desired the applicating means may be in the form of individual rollers such as described in application U.S. Pat. No. 4,867,834 rather than a single roller.

Figure 4:
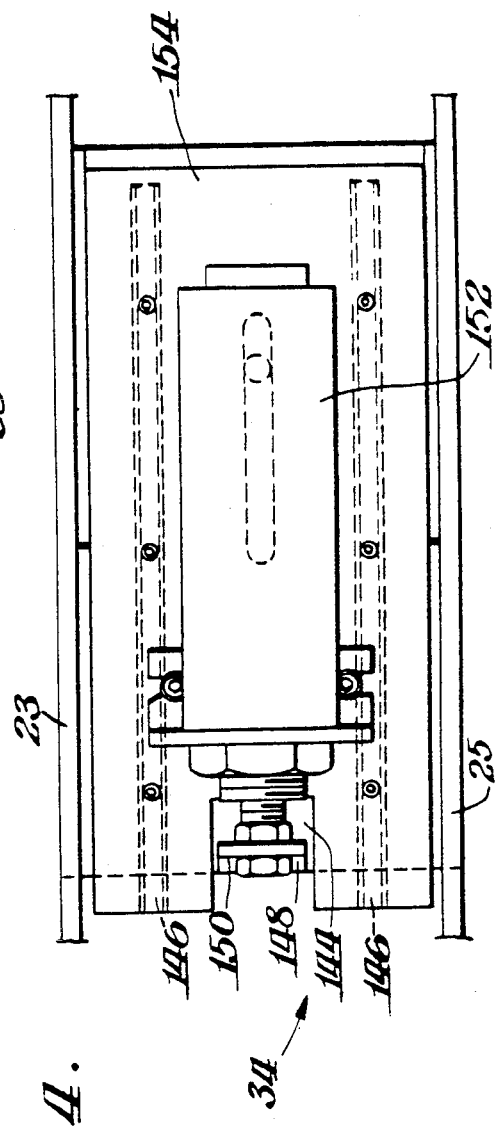
FIG. 4 is a bottom plan view showing the reciprocating mechanism for the filament head of FIGS. 2-3.
Figure 5:
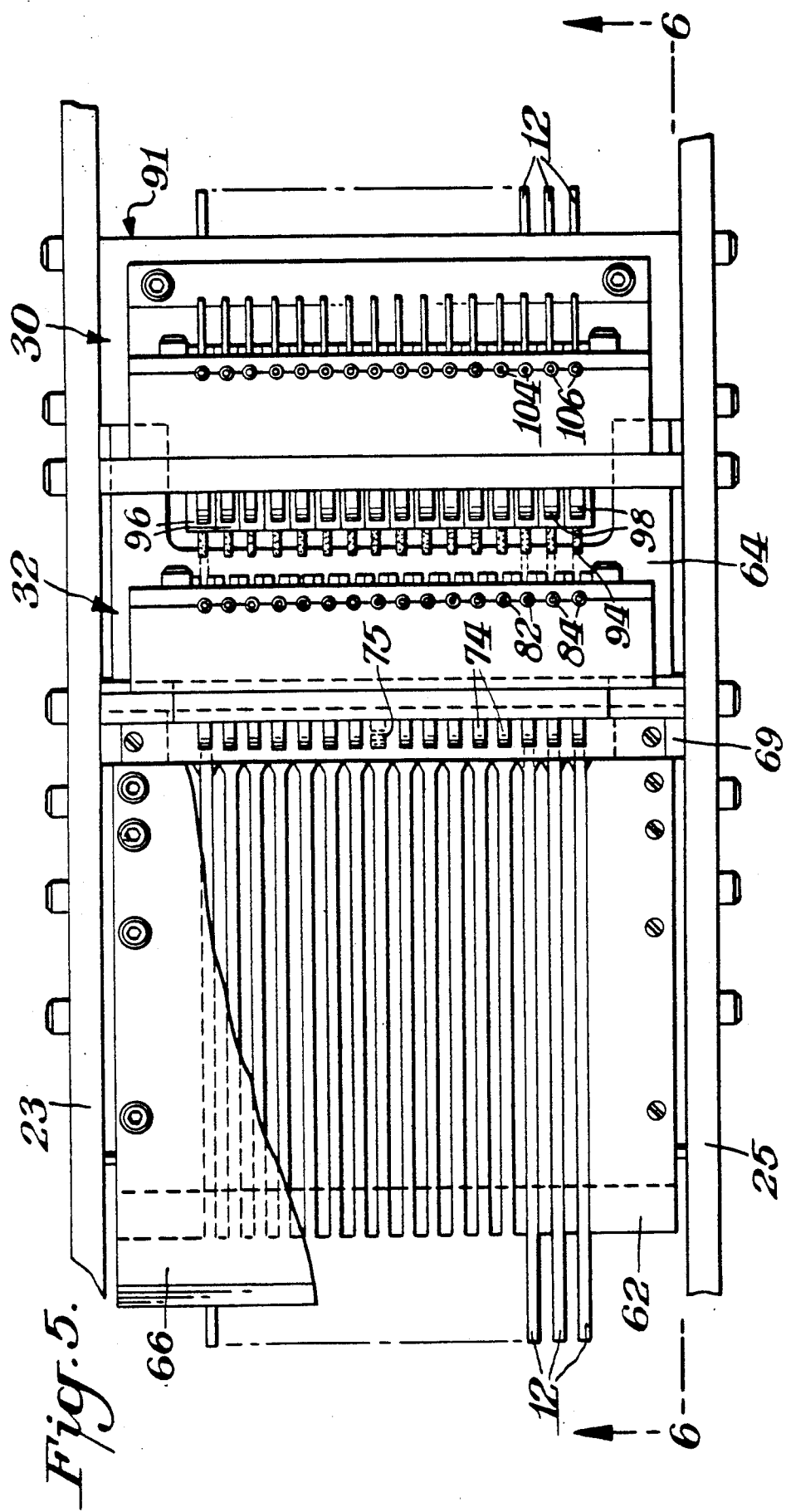
FIG. 5 is a cross-sectional view taken through FIG. 2 along the line 5—5.

The present invention also includes means for moving the filament head 14 toward from the mandrel to apply a compaction load on roller 140 so that it presses against mandrel 18. This force producing means 34 is illustrated in FIG. 2 and also in FIG. 4. As shown therein filament head 14 is mounted on a floor plate 144 which connects side frame plates 23, 25 and rides on rail 146 such as a Thompson rail. A base member 148 connected to frame 23 is secured directly to the floor plate 144. Pin 149 secured to plate 144 rides in guide slot 151 which limits the movement of pin 149 and plate 144. Base member 148 is connected to an actuating rod 150 which reciprocates in air cylinder 152. The stroke of actuating rod may be of any suitable amount such as two inch travel. Thus, by actuating air cylinder 152 rod 150 would be extended which in turn would carry the entire filament head 14 and the applicating roller 140 toward mandrel 18. The machine controller positions roller 140 to follow the contour of the mandrel with air cylinder 152 providing the cushion.

As also shown in FIG. 2 a bracket 154 is provided for mounting the force mechanism and thus the filament head directly to six-axis machine 20. Since such a six-axis machine is known it is not necessary to repeat its details herein. Similarly known computer technology could be utilized for controlling the various functions of computer 22.

As can be appreciated the system 10 of this invention, thus provides a means for accurately applying a winding band to an irregularly shaped mandrel in such a manner that individual tows may be selectively cut from the winding band and then readded to the winding band in accordance with this specific contour of the mandrel. Control of the cutting and later addition of the tows is readily accomplished by the mirror image sets of assemblies provided in the filament head. The filament head also includes means for preheating the tow wherein the temperature control is monitored by computer 22 so that the heating causes the proper width of the tows. Downstream from the heating station is a chilling station to apply a chilled gas and thereby chill the tows which permits a clean cut to be made by the cut assemblies. By utilizing the filament cutting head on a six axis machine and in turn by providing the reciprocating movement to achieve a seventh type of movement, it is possible to maximize the uniformity of tow application to the mandrel.

What is claimed is:

1. In a filament winding system using a cut/add delivery head for winding a plurality of tows forming a winding band onto a mandrel to form an irregular shaped object, the improvement being a cut/add delivery head comprising:
   a) an upper cut/add assembly wherein half of the tows are conveyed therethrough.
   b) a lower cut/add assembly disposed at an angle to said upper assembly wherein the remaining half of the tows are conveyed therethrough.
   c) said upper and lower assemblies being spaced from each other at their feed ends and being substantially juxtaposed at their discharge ends so that the tows being fed from each assembly to the mandrel meet in a single plane immediately before passing to applicating means, each assembly comprising i) distributing means being located at said feed end of said assembly for spacing the tows and feeding the tows inwardly in said head, ii) ribbonizing means for ribbonizing or spreading the tows to a desired width and thickness, iii) chilling means for cooling the tows coming from the ribbonizing section, iv) cutting means to selectively cut individual tows passing through said assembly which are not to be applied to the mandrel as part of the winding band, v) add means upstream from said cutting means for holding said cut tows and adding said cut tows on demand to permit the application of cut tows to the mandrel as part of the winding band, and d) applicating means at said discharge ends of said assemblies for receiving the tows in a single plane from each of the upper cut/add assembly and the lower cut/add assembly and applying the tows to the mandrel.

2. The head of claim 1 wherein said cutting means includes a plurality of reciprocatingly mounted knives whereby an individual knife may be associated with each corresponding tow, and knife actuating means for selectively moving each knife to and from a cutting position.

3. The head of claim 2 wherein said add means includes fixed roller means and a plurality of reciprocatingly mounted rollers whereby an individual roller may be associated with each corresponding tow, and roller actuating means for selectively moving each roller toward and away from said fixed roller means.

4. The head of claim 3 wherein said chilling means is upstream from said add means to apply a cold gas against a chill roller to chill the tows and facilitate the handling of the tows.

5. The head of claim 4 including pressure means for moving said applicating means toward the mandrel.

6. The head of claim 5 wherein said chilling means includes a roller means over which the tows pass, and nozzle means directed toward said chilling means roller for applying the gas against the chill roller.

7. The head of claim 6 wherein said chilling means roller means comprises a roller for each tow whereby each tow may be located on an individual roller, and said nozzle means comprising a plurality of discharge holes in a cold gas supply pipe parallel to said chilling means rollers, and each of said discharge holes being directed toward a respective one of said chilling means rollers.

8. The head of claim 5 including a frame, said distributing means and said cut/add assemblies and said applicating means being mounted to said frame, said pressure means including a cylinder, a rod reciprocally mounted in said cylinder, said frame being mounted to said rod, a rail, and said frame being mounted on said rail to move on said rail in accordance with the movement of said rod into and out of said cylinder.

9. The head of claim 5 wherein said ribbonizing means includes heating means and is downstream from said distributing means and upstream from said chilling means for adjusting the temperature and amount of wrap angle of the tows to control the width and thickness to which the tows are spread.

10. The head of claim 9, in combination therewith, wherein said head is mounted on a multiaxial machine.

11. The head of claim 2 wherein said knife actuating means comprises a pivotally mounted arm, one end of said arm being disposed toward its said knife and the other end being remote from said knife, and means for pivoting said arm to urge said knife to its cutting position.

12. The head of claim 11 wherein said knife is slidably mounted in a guide member, said guide member having a guide channel in which said knife travels, an actuating member is said guide channel disposed against said one end of said arm, a first spring reacting against said knife and said actuating member, a cable secured to said other end of said arm, a second spring reacting against said other end of said arm, and means for applying a force to said cable to overcome the force of said second spring.

13. The head of claim 11 wherein said knife has a chisel type cutting edge.

14. The head of claim 11 wherein said knife has a spade type cutting edge.

15. The head of claim 11 wherein said knife has a pointed cutting edge.

16. The head of claim 3 wherein said fixed roller is continuously driven by motorized gear means, said reciprocatingly mounted roller being secured to a pivotally mounted mount member, said roller actuating means including a pivotally mounted arm, one end of said arm being disposed against said mount member, and means for pivoting said arm to move said reciprocatingly mounted roller against said fixed roller.

17. The head of claim 16 including clamp means for holding cut tows in said head.

18. The head of claim 17 including spring means reacting against said arm, and said means for pivoting said arm including a cable secured to the end of said arm remote from said mount member, and means for applying a force to said cable to overcome the force of said spring.

19. The head of claim 7, in combination therewith, wherein said head is mounted on a multiaxial machine.

20. The head of claim 19 including computer means for controlling the operation of said head and of said machine.

21. The head of claim 1, in combination therewith, wherein said head is mounted on a multiaxial machine.

22. The head of claim 21 including computer means for controlling the operation of said head and of said machine.

* * * * *